Feb. 18, 1947.          W. S. LANDON          2,416,267
AUTOMATIC ORIFICE CLEANING DEVICE
Filed April 22, 1944

INVENTOR.
Walter S. Landon
BY
Andrew K. Foulds
his ATTORNEY

Patented Feb. 18, 1947

2,416,267

UNITED STATES PATENT OFFICE 2,416,267

AUTOMATIC ORIFICE CLEANING DEVICE

Walter S. Landon, Detroit, Mich., assignor to Detroit Lubricator Company, Detroit, Mich., a corporation of Michigan Application April 22, 1944, Serial No. 532,258

12 Claims. (Cl. 137—68)

The invention relates to valves for controlling the flow of liquids and it has particular relation to a valve structure for controlling the flow of fuel oil to a burner.

In the use of oil burning heating systems, valves controlling the flow of the oil sometimes become closed or partially closed owing to the collection of wax or other foreign matter in the valve. In the case of a valve for controlling the flow of oil to a pilot light, closing of the valve is particularly undesirable since it is essential that the pilot light burn at all times. The problem of maintaining the pilot light valve open is more pronounced for the reason that the opening must of necessity be small in order to supply a small quantity of oil. It is, of course, to be realized that if the pilot light ceases to burn due to closing of the valve by wax or the like, the burner will not function since there will be nothing to ignite the oil to provide a higher fire when heating is required.

One object of the present invention is to provide a device for automatically cleaning a valve used for controlling the flow of fuel oil to a pilot light in a fuel burning system.

Another object of the invention is to provide a valve device of the character stated wherein the valve is automatically and periodically cleaned by operation of a float control.

Another object of the invention is to provide an improved form of safety device for automatically controlling flow of fuel oil or the like which operates in conjunction with a float valve to insure closing of an inlet valve in the event the float valve fails to fully close the valve.

Another object of the invention is to provide an improved valve construction having improved means for straining the oil and also for preventing water in the fuel from flowing to the burner.

Other objects of the invention will become apparent from the following description, from the drawing to which it relates and from the claims hereinafter set forth.

For a better understanding of the invention reference may be had to the accompanying drawings wherein.

Figure 1:
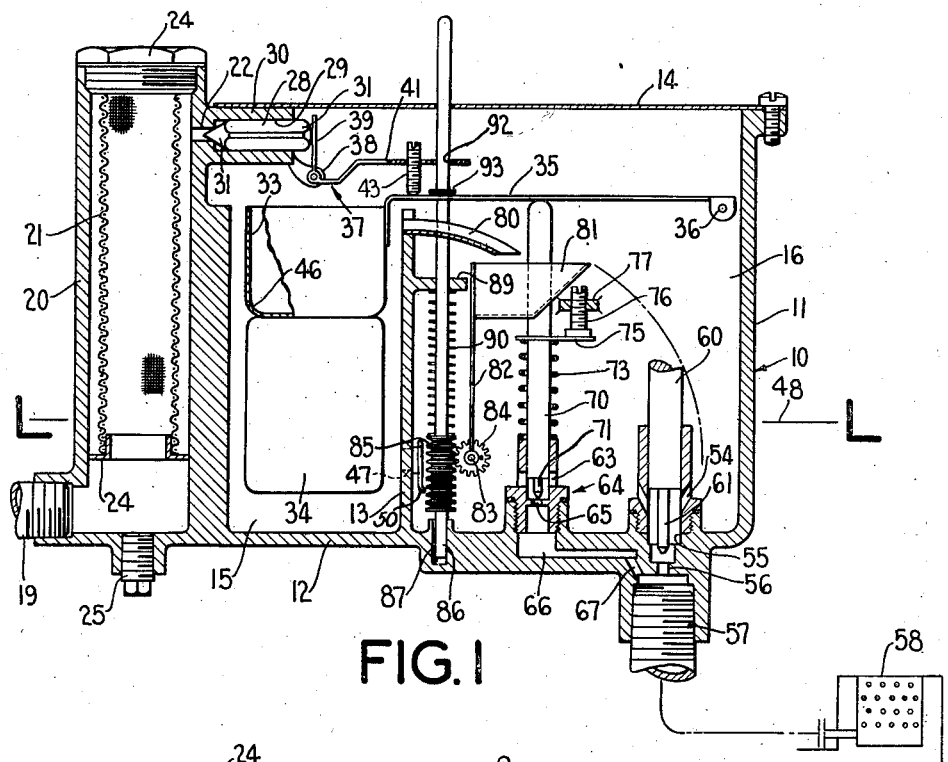
Figure 1 is a cross-sectional view of a valve device constructed according to one form of the invention.

Referring to the figures, the valve comprises a casing 10 having a side wall 11, a bottom wall 12, an inner partition 13 and a removable cover 14. The partition 13 divides the casing into a float chamber 15 and a valve chamber 16 although the partition terminates substantially below the cover 14 so as to leave a space common to both chambers above the partition. Oil enters the float chamber 15 by means of an inlet line 19 connected to the bottom of a vertically disposed cylinder 20 which is integral with the casing 10 next to the float chamber. Oil passing into the lower part of the cylinder flows upwardly into the interior of a cylinder screen or strainer 21 and then flows outwardly through the screen into the space around it and from this space it can flow through a small opening 22 in the side wall 11 and near the upper edge thereof.

The screen rests on a washer or bushing 24 in the lower part of the cylinder 20 and is held in position by means of a cap 24 threaded into the upper end of the cylinder. A drain plug 25 is threaded into the bottom wall of the cylinder 20. In view of the fact that water is heavier than oil, any water in the fuel will not flow through the opening 22 unless the height of the water reaches the opening. Since the screen is vertically arranged and is of substantial height, this condition probably would not occur and in any event removal of the plug 25 infrequently will permit removal of the water and other matter that may collect.

Flow of oil through the opening 22 is controlled by means of a valve pin 28 slidable in a cylindrical opening 29 formed in a tubular projection 30 integral with the side wall 11. This valve pin has a conical end 31 movable into and out of the opening 22 so as to open or close it. In order to permit the flow of the oil along the side of the pin, the latter has longitudinally arranged grooves 31. When the valve is opened, the oil flows out of the tubular portion 30 and pours downwardly into the receptacle part 33 mounted on a hollow metal float 34 disposed in the float chamber 15. This float is carried by an arm 35 located above the partition 13 and having its end pivotally mounted on a pin 36, secured to the side wall 11 at the far side of the valve chamber 16.

A bell crank 37 pivoted on a projection 38 on the tubular projection 30 has an arm 39 abutting the outer end of the valve pin 28 while the other arm of the bell crank indicated at 41 extends substantially parallel to the float arm 35 but in vertically spaced relation thereto. A stud 43 threaded through the arm 41 abuts the upper side of the arm 35. From this it will be apparent that when the float moves upwardly, the valve will close, and hence when the float moves downwardly, the valve can open so as to maintain a certain level of liquid in the float chamber. It will be understood that there will be enough head pressure on the inlet oil so as to force the valve pin open when the float permits the pin to move, but this head pressure is relatively low so that the oil will readily pour into the receptacle 33.

The receptatcle 33 has a small opening 46 slightly above its bottom wall so as to allow oil in the receptacle to flow into the float chamber around the receptacle. Oil flows out of the float chamber and into the valve chamber through an opening 47 in the lower part of the partition 13. The level of the oil in both the float and valve chambers may, for instance, be at the line indicated at 48, and in order to positively prevent the level in chamber 16 from rising beyond the line 48, a float 49 carried by a U-shaped arm 50 is provided in the chamber. This arm is pivoted on the casing wall as indicated at 51 and has a sealing disc 52, such as oil-resistant rubber, for closing the opening 47.

Figure 2:
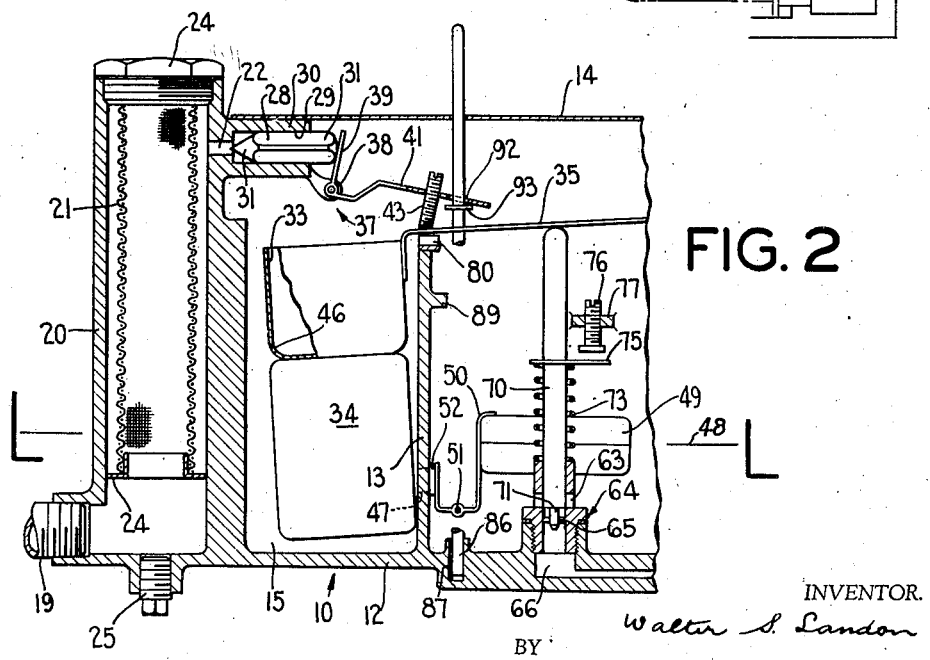
Figure 2 is a fragmentary view on the same order as Figure 1 illustrating the parts in a different stage of operation.

If the level of the oil in the float chamber 15, and hence in the valve chamber, drops materially below the line 48, the float 34 drops and allows the valve 28 to open slightly and a small amount of oil will flow into the receptacle 33. Due to the fact that the opening 46 in the receptacle is slightly above its bottom, it will be realized that a certain quantity of oil will flow into the receptacle before any will flow out, and the amount of oil that will so collect will be increased to a certain extent by surface tension on the oil, as will be readily understood. When enough oil at this slow rate has flowed into the receptacle, the weight of the float and oil will open the valve to a greater extent, and oil will flow more rapidly into the receptacle. What really happens is that the float opens slightly, and then it opens more widely, and oil flows more rapidly into the receptacle 33, and the weight of the filling receptacle causes the float to drop, it being understood that the flow into the receptacle will be substantially greater than the outward flow through the opening 46. The float thus falls quickly to a fully opened valve position as shown in Figure 2, and oil fills and overflows from the receptacle into the float chamber.

As the level in the float chamber rises, the float moves upwardly and finally closes the valve. During this time the oil is flowing from the receptacle through the opening 46, and some may flow through the opening 47 in the lower part of the partition at least until the float 49 closes the opening.

The level of the liquid in the float chamber and the level of the liquid in the receptacle 33 gradually equalize, with the level substantially higher than the normal opening level 48 previously indicated. Now, as the level continues to drop through use of the oil, the float will not drop, because with the higher level in the float chamber, it is still urged upwardly to a valve closing position, and it is only when the level reaches a point below the normal level 48 that the float drops to initiate another cycle of float operation. From this description it should be understood that the float, instead of pulsating rapidly in order to maintain the liquid level, opens and closes less frequently and between the closing and opening periods allows a larger quantity of oil to flow more rapidly into the float chamber.

Oil in the valve chamber 16 flows through openings 54 into a passageway 55 leading to a discharge valve port or opening 56, and from this opening the oil flows through a fuel line 57 leading to a burner 58. The valve port 56 is opened and closed in accordance with heat requirements by means of a valve stem 60 having a lower, smaller part 61 movable through the opening 56 so as to close and clean the opening simultaneously. Movement of the valve stem 60 is governed by thermostatically controlled means so that more oil flows into the burner when more heat is required.

A pilot light forming part of the burner 58 is supplied by oil flowing through openings 63 and a valve device projection 64 on the bottom wall of the valve chamber. Then the oil flows through a small opening 65 leading to a passage 66 which in turn joins a small opening 67 in turn communicating with the fuel line 57. The valve opening 65 is adapted to be closed and opened by means of a valve stem 70 having a smaller end 71 movable entirely through the opening so as to clean the latter when the smaller part moves through the opening.

A spring 73 encircling the valve stem 70 abuts at its lower end the projection 64 and at its upper end a collar 75 which in turn is adapted to engage a limiting screw 76 threaded into a projection 77 on the casing wall. From this it should be understood that the stem 70 can be moved downwardly so as to pass through the opening 65 and that it can be moved upwardly by the spring 73 to a position limited by the screw 76. The upper end of the valve stem 70 normally abuts the underside of the float arm 35.

It should now be apparent that if the parts are in the relative positions shown by Figure 1, oil is flowing through both the pilot and high fire valves and hence the level of the liquid is gradually lowering. Then upon initial movement of the float, the valve pin 28 will allow oil to flow into the float chamber and into the receptacle 33 and when the float is sufficiently heavy, for reasons previously stated, it will move down rather quickly and to a substantial extent. This movement, in addition to allowing the flow of the oil into the float chamber, will automatically move the pilot valve stem downwardly thereby causing the smaller end 71 to move through the opening 65 so as to clean the latter. This action occurs against the force of the spring 73 and it should be understood that the arrangement and relationship of parts including the strength of spring 73 will be such as to allow the stated operations. In fact, the spring 73 need not be more than a very light spring since its only function is to raise the valve stem 70 as the float moves upwardly.

While it will be seen that the opening 65 will be closed periodically by this operation, this cutting off of the pilot light supply line will not affect the pilot light even though the main valve 60 is closed, since there is always a sufficient supply of oil between the pilot light and the pilot valve to cause the pilot light to continue burning during the times that the pilot valve pin is in closed positions. Ordinarily, the pilot light valve will not be closed more than 5 to 10 seconds at any one time, or, in other words, the float will not be in its lower position more than 5 to 10 seconds.

In order to provide a safety means for insuring forceful seating of the conical end 31 of the valve pin 28 in the event the valve does not fully close through action of the float, an overflow 80 is provided adjacent the upper edge of the partition 31 and this overflow leads to a receptacle 81 in the valve chamber. The receptacle is mounted on an arm 82 extending vertically and the lower end of this arm is connected to a pinion 84 fixed to pin 83 pivoted on the side wall of the casing. This pinion 84 meshes with a rack 85 forming part of a vertically movable pin on thrust rod 86 which has one end slidable in a vertical opening 87 in the bottom wall of the casing and an upper part slidable through a projection 89 on the partition. A light spring 90 around the pin 86 between the rack 85 and the projection 89 serves normally to urge the rack downwardly and hence the arm 82 and receptacle 81 into an elevated position. At its upper end the pin 86 extends through an opening 92 in the arm 41 and through the cover 14 and below the arm it has a collar 93 for engaging the arm 41 upon sufficient upward movement of the pin.

In the event now the valve pin 28 does not completely close when it should be closed, the oil overflows into the receptacle 81, and with this receptacle offset from the vertical arm 82, the weight of the oil tends to swing the arm downwardly since sufficient oil in the receptacle 81 will overcome the spring 90 and initiate downward movement of the receptacle. The latter with its contents then moves downward and at an accelerating rate due to the fact that as it moves downwardly, its moment arm relative to the pivot 83 increases. As the receptacle and contents approach the lower limit of the swing, at which time the movement is rapid, and at which time the upward movement of pin 86 is rapid, the collar 93 on the pin forcefully strikes the arm 41 and thereby delivers a forceful blow to the end of the valve pin 28. Normally this forceful blow will cause the valve pin to close fully, even though there is a little wax or other matter which prevented the float from closing the valve.

When the receptacle 81 approaches its lower position, it spills its contents and then will not return to its vertical position, as spring 90 is not strong enough to return it. It is then necessary to reset the device by manually pushing downwardly on the upper end of pin 86 so as to positively swing the receptacle upwardly where due to the almost vertical position of the receptacle the spring 90 will hold it.

Although only one form of the invention has been illustrated and described in detail, it will be apparent to those skilled in the art that various modifications may be made without departing from the scope of the appended claims.

I claim:

1. A valve device for controlling the flow of liquids comprising a casing having an inlet chamber and a constant level chamber, a wall separating said chambers and having a port therethrough below the constant level, an inlet opening for allowing liquid to flow into said inlet chamber, an outlet from said constant level chamber, a first valve element for opening and closing the inlet opening, a second valve element for opening and closing the outlet opening, a float in said inlet chamber and operatively connected to the first valve element so as to govern the inflow of liquid and the level of liquid in said inlet chamber, a valve member controlling said port, a float in said constant level chamber and operatively connected to said valve member to maintain a constant liquid level over said outlet opening, and means operatively connecting said first-named float to the second valve element to open and close the latter upon predetermined movement of said first-named float.

2. A valve device for controlling the flow of liquids comprising a casing having an inlet chamber and a constant level chamber, a wall separating said chambers and having a port therethrough below said constant level, an inlet valve for allowing liquid to flow into said inlet chamber, a float in said inlet chamber and connected to the inlet valve for governing the operation of the valve and the level of the liquid in said inlet chamber, an outlet opening from said constant level chamber, a valve member controlling said port, a float in said constant level chamber and operatively connected to said valve member to maintain a constant liquid level over said outlet opening, a valve pin movable entirely through said outlet opening to clear the latter, and means operatively connecting said pin to said first-named float for movement therewith.

3. A valve device for controlling the flow of liquids comprising a casing having an inlet chamber and a constant level chamber, a wall separating said chambers and having a port therethrough below the constant level, an inlet opening adjacent the top of said inlet chamber, a discharge conduit leading from said opening, a valve element movable to open and close said opening, a float in said inlet chamber, an arm pivoted in the casing and carrying the float, means moved by the arm for moving the valve element, a receptacle having a drain opening and mounted on said float to receive liquid from said conduit to cause quick opening of said element, an outlet opening from said constant level chamber, a valve member controlling said port, a float in said constant level chamber and operatively connected to said valve member to maintain a constant liquid level over said outlet opening, and a pin movable through the outlet opening to clean it and which is movable with the arm so that movement of said first-named float effects cleaning of the outlet opening.

4. A valve device for controlling the flow of liquids comprising a casing having an inlet chamber and a constant level chamber, a wall separating said chambers and having a port therethrough below the constant level, an inlet opening to said inlet chamber, a valve element movable to open and close said opening, a float in said inlet chamber, an arm pivoted in the casing and carrying the float, means moved by the arm for moving the valve element, an outlet opening from said constant level chamber, a valve member controlling said port, a float in said constant level chamber and operatively connected to said valve member to maintain a constant liquid level over said outlet opening, a pin movable through the outlet opening to clean it and having a portion in the path of movement of said arm so as to move the pin through the outlet opening upon movement of said first-named float in that direction which allows more liquid to enter the casing, and spring means for withdrawing the pin from the outlet opening.

5. A valve device for controlling the flow of liquids comprising a casing, an inlet opening, a valve element movable to open and close said opening, a float in the casing, an arm pivoted in the casing and carrying the float, means moved by the arm for moving the valve element, an outlet opening in the casing, a pin movable through the outlet opening to clean it and having a portion abutting said arm so as to effect movement of the pin through the outlet opening upon downward movement of the float to admit liquid to the casing, spring means for withdrawing the pin as the float rises, and means for limiting movement of the pin by the spring without limiting rising movement of the float and arm.

6. A valve device for controlling the flow of liquid comprising a casing, an inlet valve, a float in the casing and operatively connected to the valve for normally controlling the level of the liquid in the casing, said casing having an overflow opening, an upright arm pivotally supported at its lower end, a receptacle mounted on the upper end of said arm and adapted to receive the overflow and which is so arranged that upon receiving a substantially predetermined amount of liquid it swings downward by gravity and rotates said arm, and means connecting the arm to the valve so as to forcefully close the valve when the receptacle swings downward.

7. A valve device for controlling the flow of liquid comprising a casing, an inlet valve, a float in the casing and operatively connected to the valve for normally controlling the level of liquid in the casing, said casing having an overflow opening, a receptacle pivotally mounted on the casing and so arranged as to receive the overflow and to swing downwardly when substantially filled, means operatively connecting the receptacle to the valve so as to forcefully close the latter when the receptacle swings downwardly, and means including a spring and for holding the receptacle elevated when substantially empty and for returning it after the latter swings downwardly and discharges its contents, the spring being of such character as to be overcome by the weight of the receptacle when a predetermined quantity of liquid is therein.

8. A valve device for controlling the flow of liquids, comprising a casing having an inlet chamber and a constant level chamber, a wall separating said chambers and having a port therethrough for flow of liquid from said inlet chamber to said constant level chamber, a float in said inlet chamber, a receptacle having a drain hole and mounted on said float, said casing having an inlet discharging into said receptacle, a valve member controlling said inlet, a lever operable to move said valve member to closed position, an arm supporting and movable by said float and supporting and operable to move said lever, a valve member controlling said port, a float in said constant level chamber and controlling said last-named valve member to maintain a constant level in said constant level chamber, and an outlet port from said constant level chamber.

9. A valve device for controlling the flow of liquids, comprising a casing having an inlet chamber and a constant level chamber, a wall separating said chambers and having a port therethrough for flow of liquid from said inlet chamber to said constant level chamber, a float in said inlet chamber, a receptacle having a drain hole and mounted on said float, said casing having an inlet discharging into said receptacle, a valve member controlling said inlet, a lever operable to move said valve member to closed position, an arm supporting and movable by said float and supporting and operable to move said lever, a valve member controlling said port, a float in said constant level chamber and controlling said last-named valve member to maintain a constant level in said constant level chamber, safety means operable to close said first-named valve member upon excess liquid level in said inlet chamber, and an outlet port from said constant level chamber.

10. A valve device for controlling the flow of liquids, comprising a casing having an inlet chamber and a constant level chamber, a wall separating said chambers and having a port therethrough below the constant level, a float in said inlet chamber, a receptacle having a drain hole and mounted on said float, said casing having an inlet discharging into said receptacle, a valve member controlling said inlet, a lever operable to move said valve member to closed position, an arm supporting and movable by said float and supporting and operable to move said lever, a valve member controlling said port, a float in said constant level chamber and controlling said last-named valve member to maintain a constant level in said constant level chamber, a thrust rod engageable with said lever to close said first-named valve member and supported for vertical reciprocation in said constant level chamber, a rack on said rod, a pinion engaging said rack, an arm extending upward from and secured to said pinion, a receptacle mounted on said last-named arm and having an inclined end wall for discharge of said receptacle upon its downward swinging movement, an overflow passageway from said inlet chamber and discharging into said second-named receptacle, means opposing downward swinging movement of said second-named receptacle, and an outlet port from said constant level chamber.

11. In a fuel supply device for feeding liquid fuel to a burner, a fuel supply casing having an outlet orifice, a cleaning pin positioned for movement through said orifice, said casing having an inlet for liquid fuel, and means operable by weight of liquid fuel to move said pin through said orifice, said means including a receptacle positioned to receive fuel directly from said inlet.

12. In a fuel supply device for feeding liquid fuel to a burner, a fuel supply casing having an outlet orifice, a cleaning pin positioned for movement through said orifice, said casing having an inlet for liquid fuel, a receptacle in said casing below said inlet to receive liquid fuel therefrom, means to transmit downward movement of said receptacle by weight of liquid therein to said pin to move said pin through said orifice, a float carrying said receptacle, a valve controlling said inlet, and means to transmit upward movement of said float to said valve to close said inlet.

WALTER S. LANDON.

REFERENCES CITED

The following references are of record in the file of this patent:

UNITED STATES PATENTS

| Number | Name | Date |
|---|---|---|
| 2,110,100 | Von Wangenheim | Mar. 1, 1938 |
| 1,983,540 | Breese | Dec. 4, 1934 |
| 1,999,306 | Smith | Apr. 30, 1935 |
| 1,507,139 | Pike | Sept. 2, 1924 |
| 726,395 | Bedworth | Apr. 28, 1903 |
| 1,886,555 | Krause | Nov. 8, 1932 |
| 2,089,186 | DeLancey | Aug. 10, 1937 |